US009881578B2

(12) United States Patent
Suzuki et al.

(10) Patent No.: US 9,881,578 B2
(45) Date of Patent: Jan. 30, 2018

(54) DISPLAY DEVICE

(71) Applicant: Japan Display Inc., Tokyo (JP)

(72) Inventors: Takayuki Suzuki, Tokyo (JP); Hiroyuki Abe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/657,284

(22) Filed: Jul. 24, 2017

(65) Prior Publication Data

US 2017/0323613 A1    Nov. 9, 2017

Related U.S. Application Data

(63) Continuation of application No. 14/727,736, filed on Jun. 1, 2015, now Pat. No. 9,747,856.

(30) Foreign Application Priority Data

Jun. 2, 2014    (JP) .................. 2014-113898

(51) Int. Cl.
| | |
|---|---|
| *G06F 3/043* | (2006.01) |
| *G09G 3/36* | (2006.01) |
| *G06F 3/047* | (2006.01) |
| *G06F 3/045* | (2006.01) |
| *G06F 3/044* | (2006.01) |
| *G06F 3/041* | (2006.01) |

(52) U.S. Cl.
CPC .......... *G09G 3/3677* (2013.01); *G06F 3/044* (2013.01); *G06F 3/045* (2013.01); *G06F 3/047* (2013.01); *G06F 3/0412* (2013.01); *G09G 3/3655* (2013.01); *G09G 3/3696* (2013.01); *G06F 2203/04101* (2013.01); *G06F 2203/04111* (2013.01); *G06F 2203/04112* (2013.01)

(58) Field of Classification Search
CPC . G06F 2203/04101; G06F 2203/04111; G06F 2203/04112; G06F 3/0412; G06F 3/044; G06F 3/045; G06F 3/047; G09G 3/3655; G09G 3/3677; G09G 3/3696
USPC ......................................... 345/170–176, 211
See application file for complete search history.

(56) References Cited

U.S. PATENT DOCUMENTS

| | | |
|---|---|---|
| 9,448,657 B2 | 9/2016 | Abe et al. |
| 2013/0188104 A1 | 7/2013 | Aoki et al. |
| 2013/0328807 A1 | 12/2013 | Matsumoto |
| 2014/0375606 A1 | 12/2014 | Abe et al. |
| 2015/0084920 A1 | 3/2015 | Abe et al. |

FOREIGN PATENT DOCUMENTS

JP    2013-152291 A    8/2013

*Primary Examiner* — Tony Davis
(74) *Attorney, Agent, or Firm* — Typha IP LLC (57) ABSTRACT

A display device includes a plurality of gate lines extended in a first direction, a plurality of common electrodes extended in the first direction, a gate scanning circuit that scans the plurality of the gate lines, and a common scanning circuit that scans the plurality of the common electrodes. The common scanning circuit includes a shift register unit, an interconnection connecting unit, and a switch unit. The gate scanning circuit and the common scanning circuit are configured of single channel thin film transistors. The gate scanning circuit is disposed between the shift register unit and the interconnection connecting unit, and the interconnection connecting unit is disposed between the gate scanning circuit and the switch unit in a planar view.

10 Claims, 10 Drawing Sheets

//DISPLAY DEVICE

CROSS-REFERENCE TO RELATED APPLICATIONS

This application is a continuation of U.S. patent application Ser. No. 14/727,736, filed on Jun. 1, 2015. Further, this application claims priority from Japanese Patent Application JP2014-113898 filed on Jun. 2, 2014, the contents of which are hereby incorporated by reference into this application.

BACKGROUND

The present disclosure relates to a display device, and is applicable to a display device having a drive circuit configured of a single channel thin film transistor, for example.

A display device has a display panel, and the display panel is configured in which a liquid crystal composition is sealed between two substrates, for example. Moreover, such a display panel is mass-produced that a touch panel is disposed as an input device on the front side of the display panel. There is a display panel in which a change in the electrostatic capacitance between two electrodes disposed through an insulating film is detected for the detection of the input on this touch panel (in the following, referred to as a touch). In the following, the display panel is referred to as an electrostatic capacitive touch panel. For the electrostatic capacitive touch panel, a so-called In-cell touch panel is proposed in which a display counter electrode (a common electrode) originally provided in a display panel is also used for one electrode (a scanning electrode) of a pair of touch panel electrodes and the other electrode (a detection electrode) is disposed so as to cross this counter electrode (see Japanese Unexamined Patent Application Publication No. 2013-152291).

In the In-cell touch panel described in Japanese Unexamined Patent Application Publication No. 2013-152291, a counter electrode selection circuit that selects the counter electrode and a scanning line drive circuit that supplies a scanning voltage to scanning lines are disposed on left and right picture frame regions.

SUMMARY

When a counter electrode selection circuit (a common scanning circuit), a scanning line drive circuit (a gate scanning circuit), and the like are configured of a single channel transistor, the circuit area is increased more than the circuit area of a CMOS circuit because a dynamic circuit using capacitance is used.

The other problems and novel features will be apparent from the description and accompanying drawings of the present disclosure.

The outline of the representative aspect of the present disclosure is as follows.

In other words, a display device includes an array substrate and a counter substrate. The array substrate includes: a plurality of gate lines extended in a first direction; a plurality of common electrodes extended in the first direction; a plurality of drain lines extended in a second direction different from the first direction; a gate scanning circuit configured to scan the plurality of the gate lines; and a common scanning circuit configured to scan the plurality of the common electrodes. The common scanning circuit includes: a shift register unit; an interconnection connecting unit; and a switch unit. The gate scanning circuit and the common scanning circuit are configured of single channel thin film transistors. The shift register unit, the gate scanning circuit, the interconnection connecting unit, and the switch unit are disposed in this order from an end of the array substrate in the first direction in a planar view.

DESCRIPTION OF THE PREFERRED EMBODIMENTS

In the following, an embodiment, a comparative example, and an example will be described with reference to the drawings. It is noted that the disclosure is merely an example, and ones that can be easily conceived by appropriate modifications within the teachings of the present invention are of course included in the scope of the present invention. Moreover, although the width, thickness, shape, and the like of the components are sometimes schematically depicted, the components are merely examples, and will not limit the interpretation of the present invention. Furthermore, the components similar to ones already mentioned in relation with the drawings already described are designated the same reference numerals and signs, and the detailed description is sometimes appropriately omitted.

Embodiment

A display device according to an embodiment will be described with reference to FIGS. 1 to 3.

Figure 1:
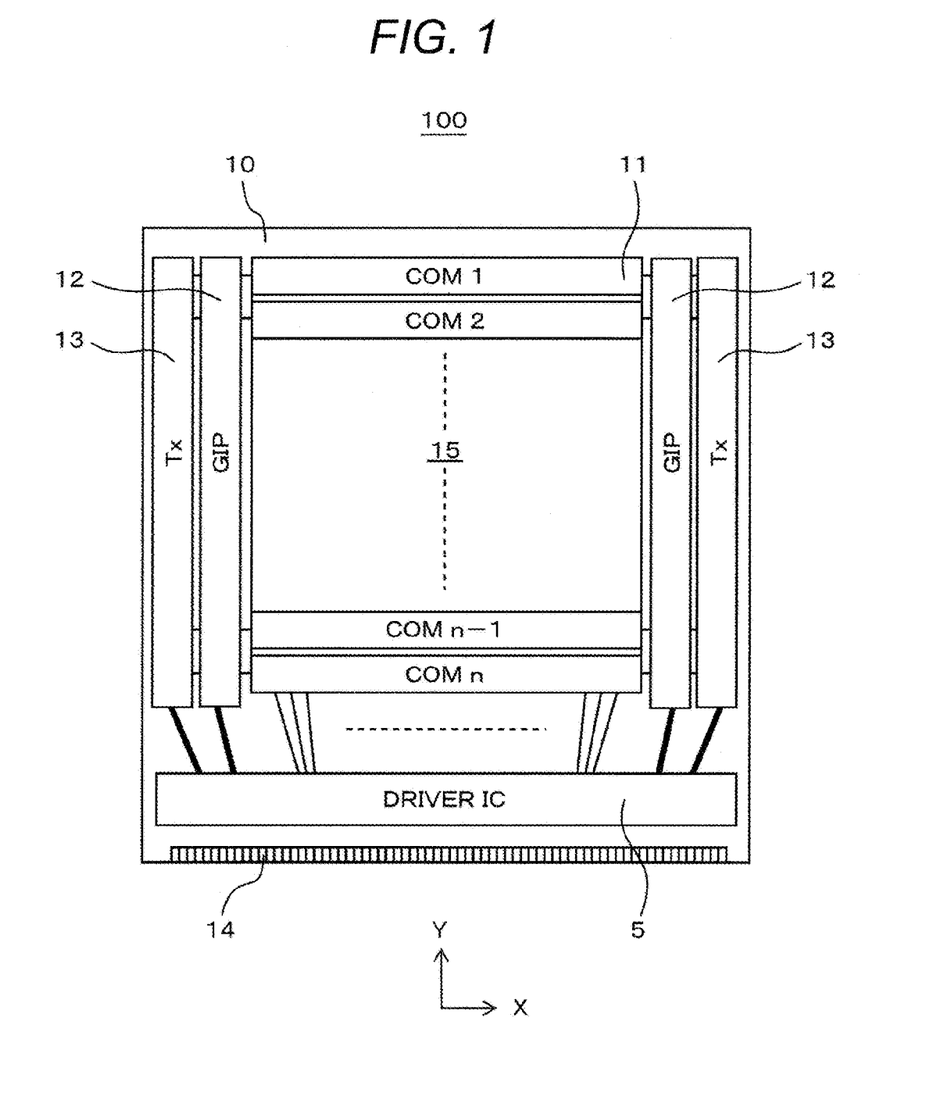
FIG. 1 is a plan view illustrative of a display device according to an embodiment.

FIG. 1 is a plan view illustrative of the display device according to the embodiment. FIG. 2 is a diagram of the configuration of a common scanning circuit of the display device according to the embodiment. FIG. 3 is a diagram of the circuit disposition of the display device according to the embodiment.

A display device 100 according to the embodiment includes an array substrate 10 and a counter substrate (not illustrated).

The array substrate 10 includes a common electrode 11, a gate scanning circuit (GIP) 12, and a common scanning circuit (Tx) 13. n common electrodes (COM1, COM2, . . . , COMn−1, and COMn) 11 are extended in an X-direction, and are connected to the common scanning circuit (Tx) 13 at both ends. A single common electrode 11 is shared by m lines of pixels for use. The common electrode 11 is also used for a touch panel scanning electrode. A pixel portion 15 is provided on the array substrate 10, and a pixel electrode (not illustrated) and the common electrode 11 are used for displaying images as a part of a pixel.

The gate scanning circuit 12 is disposed between the common scanning circuit 13 and the display region 15. The gate scanning circuit 12 is disposed on the right side and the left side of the array substrate 10, and supplied with a control signal and the like from a driver IC 5 through interconnections. The gate scanning circuit 12 then in turn drives the same gate line from the left and the right. It is noted that the two-dimensional pattern of the overall gate scanning circuit 12 is in a rectangular shape in which the Y-direction of the pattern is longer than the X-direction.

The common scanning circuit 13 is disposed on the right side and the left side of the array substrate 10, and supplied with an alternating drive signal (VCOMAC), a direct current drive signal (VCOMDC), and the like, described later, from the driver IC 5 through interconnections. The common scanning circuit 13 then in turn drives the same common electrode 11 from the left and the right. The common scanning circuit 13 supplies the direct current drive signal (VCOMDC) used for displaying images and the alternating drive signal (VCOMAC) used for detecting a touch position to the common electrode 11. It is noted that the two-dimensional pattern of the overall common scanning circuit 13 is in a rectangular shape in which the Y-direction of the pattern is longer than the X-direction.

A detection electrode (not illustrated) provided on the counter substrate and the common electrode 11 provided on the array substrate 10 form a capacitance. When the alternating drive signal (VCOMAC) is applied to the common electrode 11, the voltage of the detection electrode is changed. In the application, when a conductor such as a finger comes close or makes a contact, the capacitance is changed, and a voltage taken place on the detection electrode is changed as compared with the case where a conductor does not come close or does not make a contact. As described above, the function of a touch panel is provided on the display device 100 in which a change in the capacitance taken place between the common electrode 11 formed on the array substrate 10 and the detection electrode formed on the counter substrate is detected.

Figure 2:
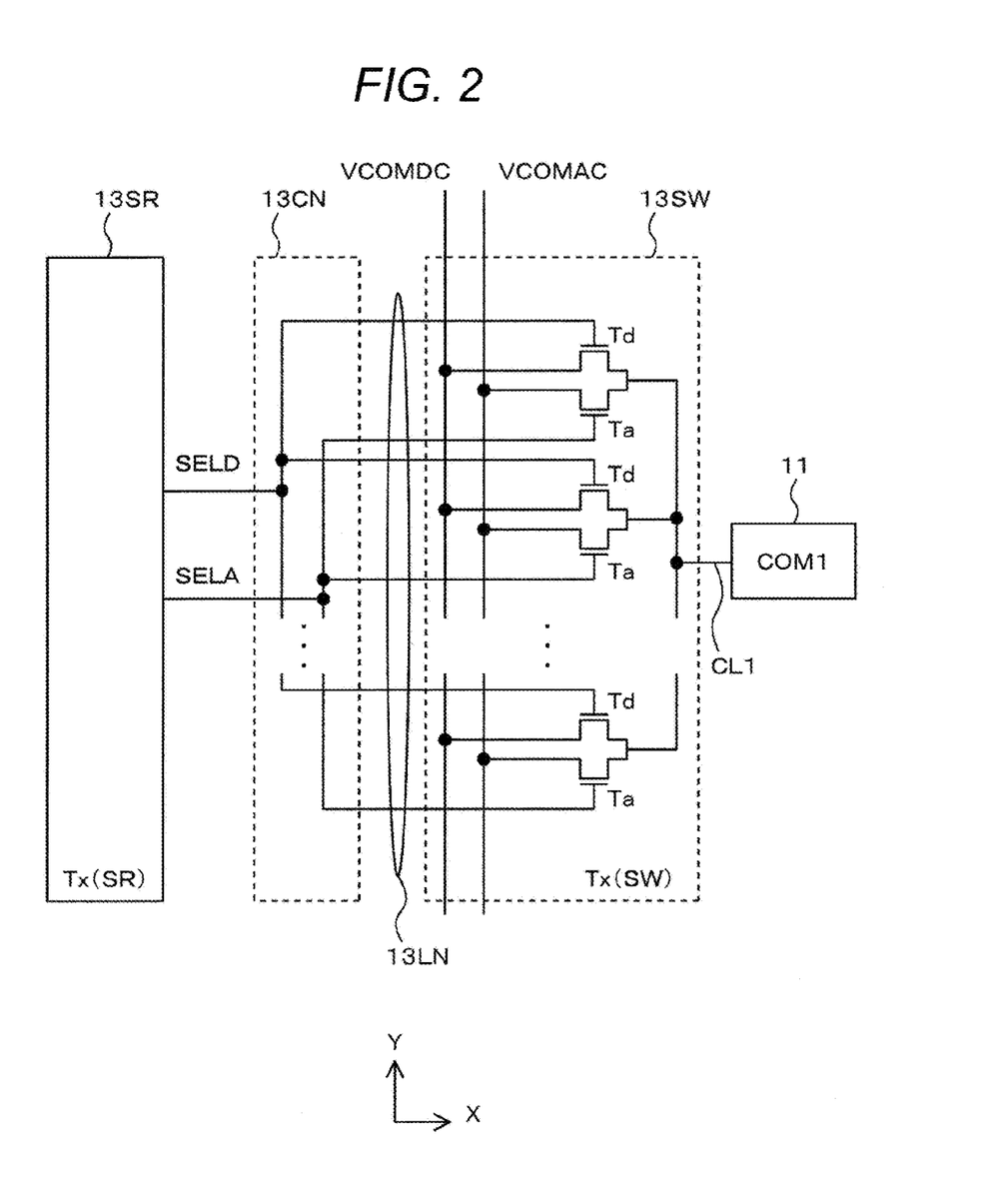
FIG. 2 is a diagram illustrative of the configuration of a common scanning circuit of the display device according to the embodiment.

As illustrated in FIG. 2, the common scanning circuit 13 is configured of a shift register unit 13SR, a connecting unit 13CN, and a switch unit 13SW. It is noted that FIG. 2 is a portion that drives a single common electrode COM1 (a portion corresponding to one stage of the shift register and the switch unit controlled by the shift register) in the common scanning circuit 13. The shift register unit 13SR in turn transfers outputs according to clock signals, and the switch unit 13SW switches between the direct current drive signal (VCOMDC) and the alternating drive signal (VCOMAC), and outputs the signals to the common electrode 11. The connecting unit 13CN transmits the signal of the shift register unit 13SR to the switch unit 13SW.

The shift register unit 13SR is configured of a single channel transistor and a capacitance, and operates as a dynamic circuit according to clock signals. For the interconnections of control signals (SELD and SELA) for two types of transistors configuring the switch unit 13SW, interconnections connecting the shift register unit 13SR to the connecting unit 13CN are extended in the X-direction, and at least two interconnections are necessary for one shift register unit 13SR.

The switch unit 13SW is configured of a plurality of single channel transistors, and there are two types of functions of these transistors, a transistor Td that outputs the direct current drive signal (VCOMDC) and a transistor Ta that outputs the alternating drive signal (VCOMAC). Therefore, the switch unit 13SW needs at least one transistor Td and one transistor Ta, two transistors in total, having a capability enough to drive the common electrode 11. An interconnection 13LN connecting the connecting unit 13CN to the switch unit 13SW is extended in the X-direction, and similarly, at least two interconnections 13LN are necessary. However, since the gate lines (not illustrated) are extended from the gate scanning circuit 12 in the X-direction and cross the switch unit 13SW, it is necessary to dispose pluralities of the transistors Td and the transistors Ta separately, and the number of the interconnections connecting the connecting unit 13CN to the switch unit 13SW is increased according to the numbers of the transistors Td and the transistors Ta. Suppose that the number of the transistors Td and the number of the transistors Ta are m, for example, the number of the interconnections 13LN connecting the connecting unit 13CN to the switch unit 13SW is 2m. It is noted that the interconnections that transmit the direct current drive signal (VCOMDC) and the alternating drive signal (VCOMAC) are extended in the Y-direction. In FIG. 2, although the interconnections that transmit the direct current drive signal (VCOMDC) and the alternating drive signal (VCOMAC) are adjacently disposed, it may be fine that the interconnections that transmit the direct current drive signal (VCOMDC) and the alternating drive signal (VCOMAC) are disposed as the transistor Td and the transistor Ta are sandwiched.

Figure 3:
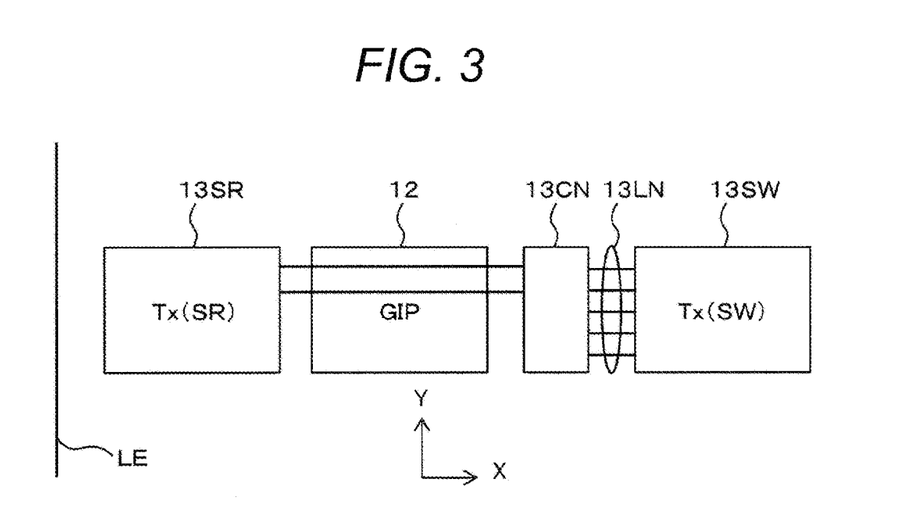
FIG. 3 is a diagram illustrative of the circuit disposition of the display device according to the embodiment.

As illustrated in FIG. 3, in the display device 100, the shift register unit 13SR, the gate scanning circuit 12, the connecting unit 13CN, and the switch unit 13SW are disposed in this order from a left end LE of the array substrate 10 in the X-direction. It is noted that FIG. 3 is a portion that drives a single common electrode COM1 in the common scanning circuit 13 similarly in FIG. 2. Moreover, the left end LE of the array substrate 10 is extended in the Y-direction. Similarly, the shift register unit 13SR, the gate scanning circuit 12, the connecting unit 13CN, and the switch unit 13SW are disposed in this order from the right end of the array substrate 10. Since the shift register unit 13SR includes the capacitance having a large area, the shift register unit 13SR is preferably disposed on the end side of the array substrate 10. Furthermore, since the switch unit 13SW drives the common electrode 11 having a large load, the switch unit 13SW is preferably disposed close to the pixel region 15 (the common electrode 11). The connecting unit 13CN splits two signals of the shift register unit 13SR to 2m signals and transmits the signals to the switch unit 13SW. The connecting unit 13CN is disposed between the gate scanning circuit 12 and the switch unit 13SW, and a plurality of the interconnections 13LN connecting the connecting unit 13CN to the switch unit 13SW does not cross the gate scanning circuit 12, so that the number of the interconnections crossing the gate scanning circuit 12 and the interconnection length are decreased, the layout space of the gate scanning circuit 12 is increased, and the suppression of electrostatic discharge damage can be implemented. Moreover, the interconnection length is decreased, so that coupling noise to which the interconnections are subjected is decreased, and it is possible to improve the reliability of the operation of the circuit as well.

COMPARATIVE EXAMPLE

Next, a technique (a comparative example) investigated prior to the present disclosure will be described with reference to FIG. 4.

Figure 4:
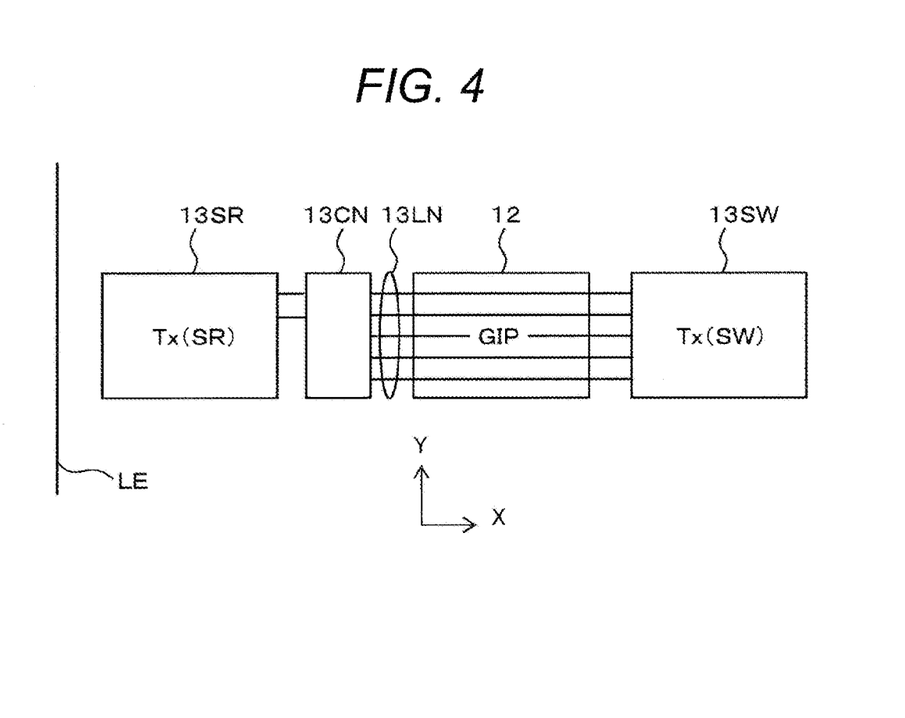
FIG. 4 is a diagram illustrative of the circuit disposition of a display device according to a comparative example.

FIG. 4 is a diagram of the circuit disposition of a display device according to a comparative example.

In the display device according to the comparative example, a shift register unit 13SR, a connecting unit 13CN, a gate scanning circuit 12, and a switch unit 13SW are disposed in this order from a left end LE of the array substrate in the X-direction. Since the connecting unit 13CN splits two signals of the shift register unit 13SR to 2m signals and transmits the signals to the switch unit 13SW, a plurality of interconnections 13LN connecting the connecting unit 13CN to the switch unit 13SW crosses the gate scanning circuit 12. Therefore, the interconnections 13LN are constraints on the layout of the gate scanning circuit 12. Moreover, in the front end of the line, thin film transistor (TFT) elements connected to the crossing interconnections are charged because of a long interconnection length, and electrostatic discharge damage is prone to occur.

EXAMPLE

A display device according to an example is an In-cell display device including a touch panel in the inside of a display panel. The structure of the display device according to the example will be described with reference to FIGS. 5 to 11.

Figure 5:
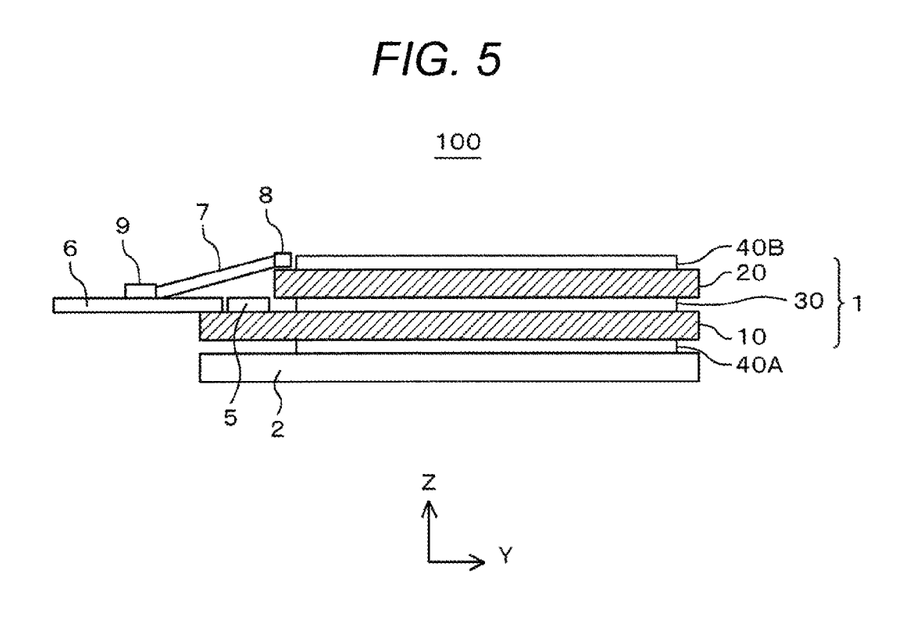
FIG. 5 is a cross sectional view of a display device according to an example.
Figure 6:
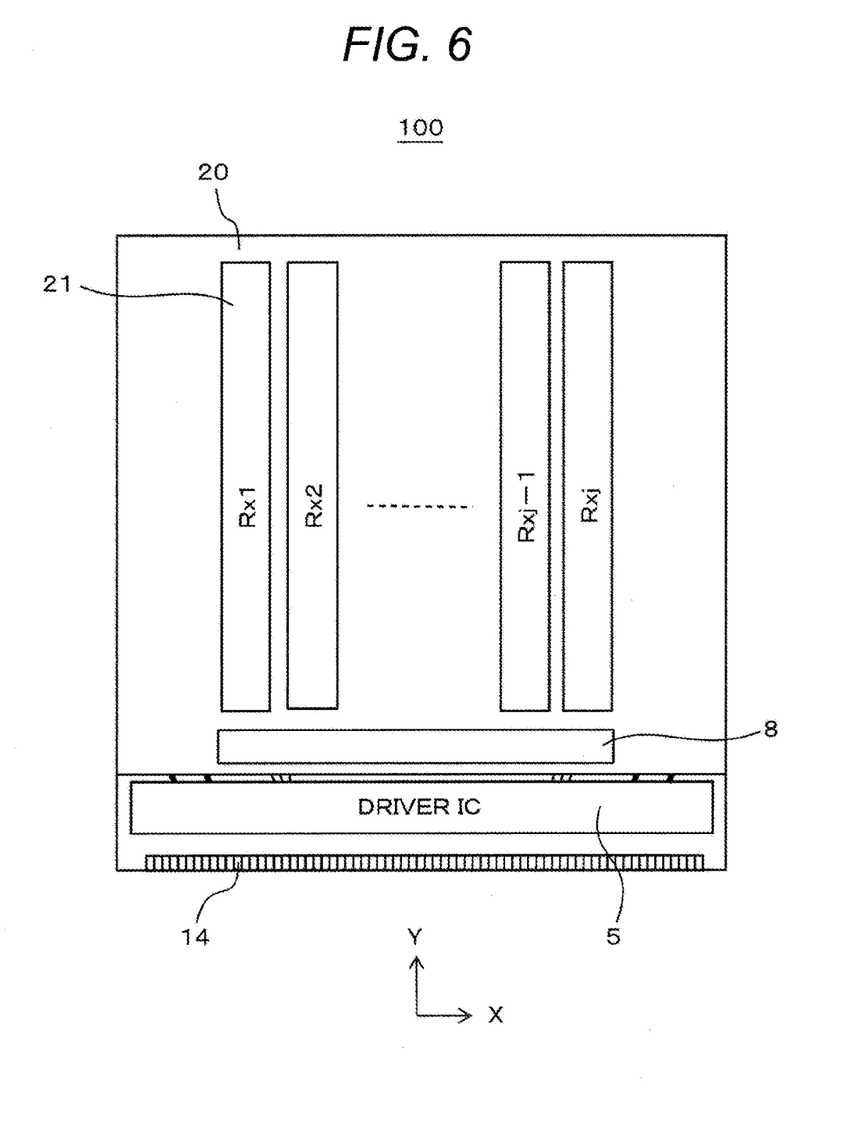
FIG. 6 is a plan view illustrative of a counter substrate of the display device according to the example.
Figure 7:
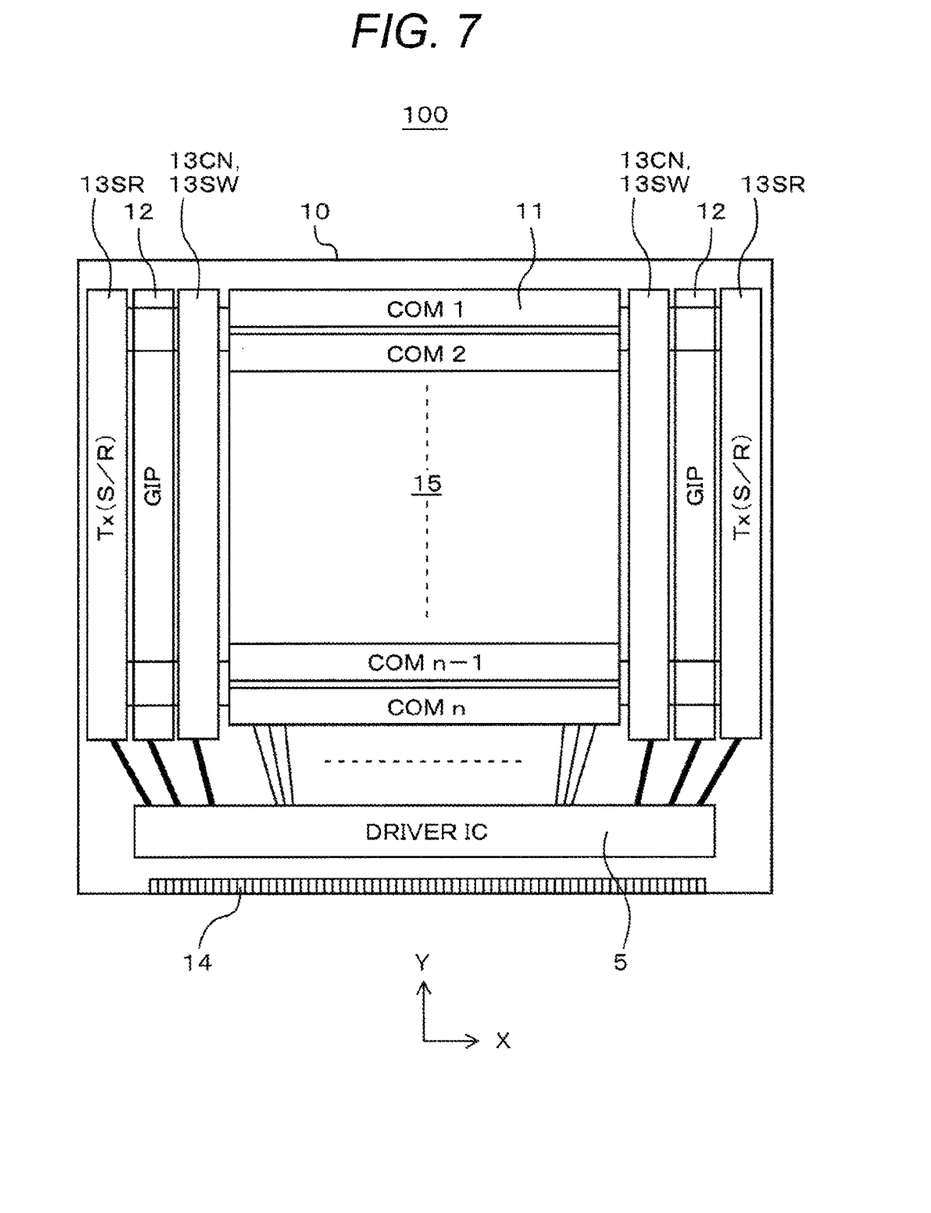
FIG. 7 is a plan view illustrative of an array substrate of the display device according to the example.
Figure 8:
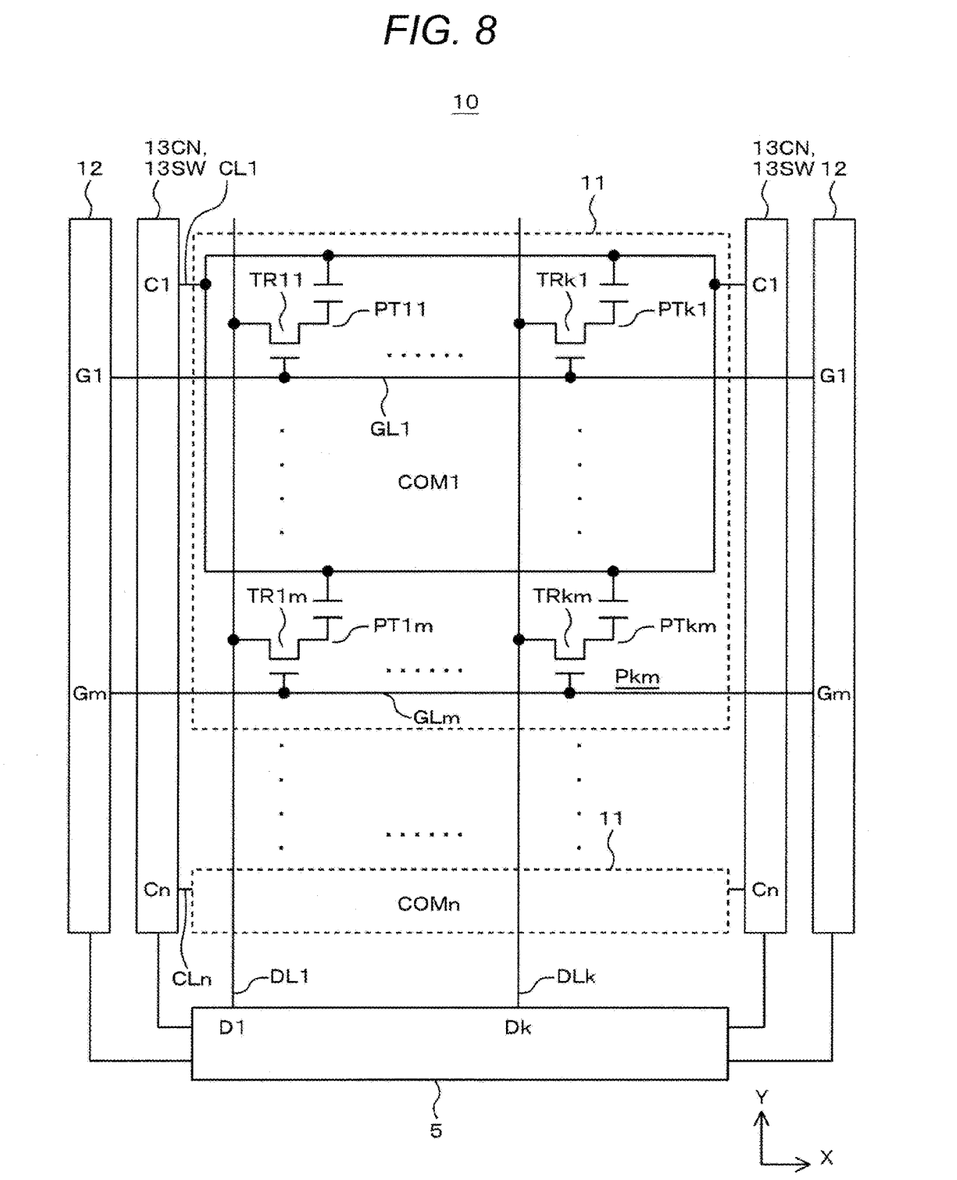
FIG. 8 is a block diagram of portions formed on the array substrate of the display device according to the example.
Figure 9:
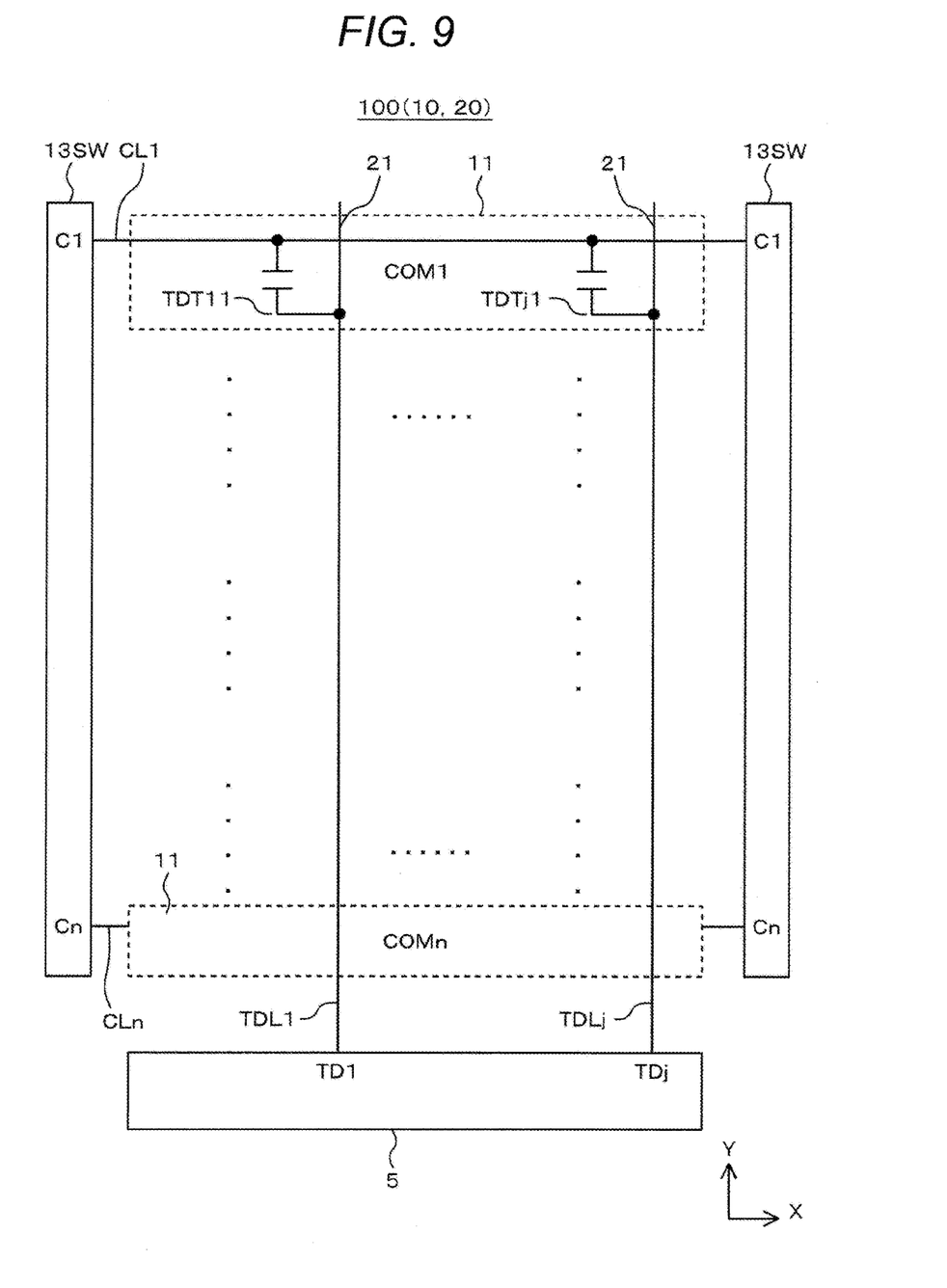
FIG. 9 is a block diagram of a touch detecting portion of the display device according to the example.
Figure 10:
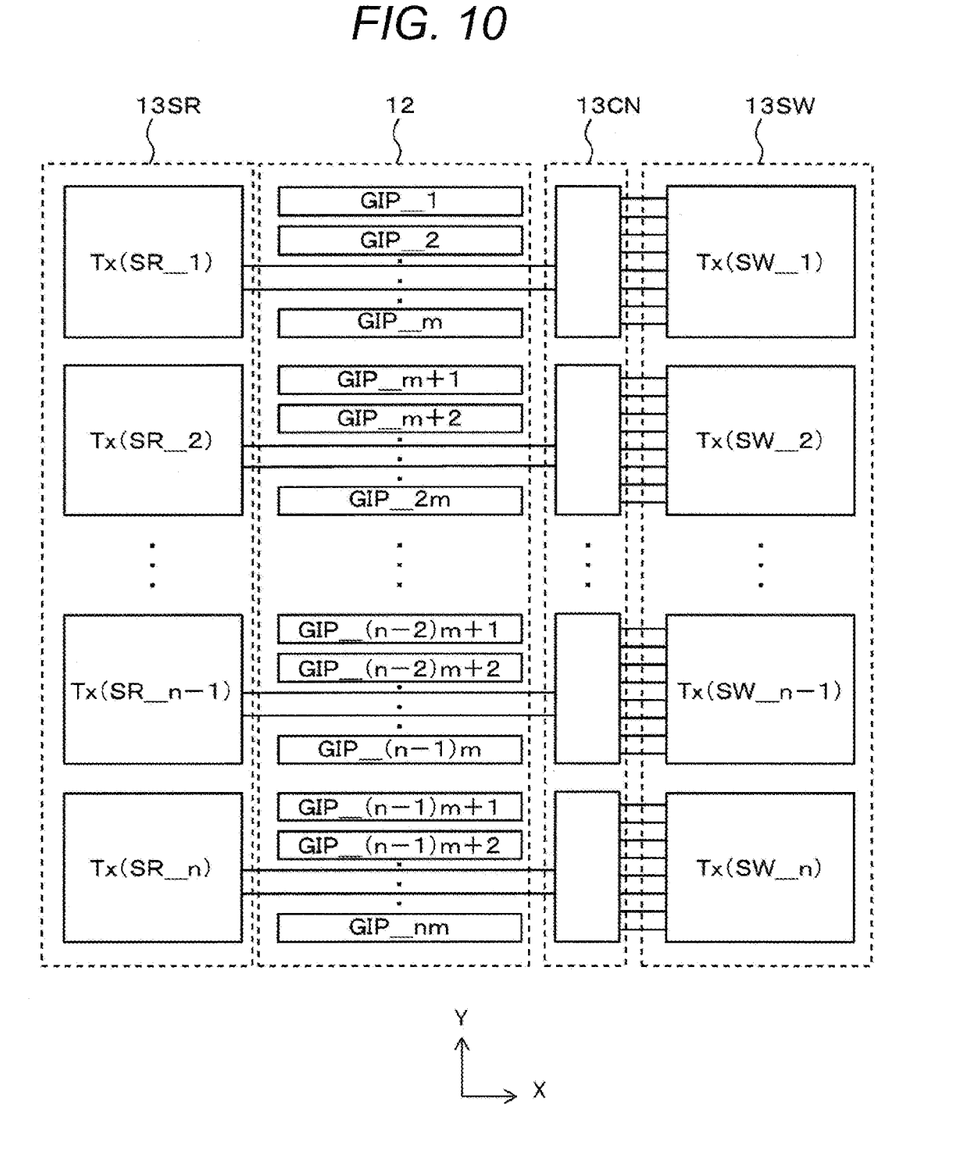
FIG. 10 is a diagram illustrative of a common scanning circuit and a gate scanning circuit of the display device according to the example.
Figure 11:
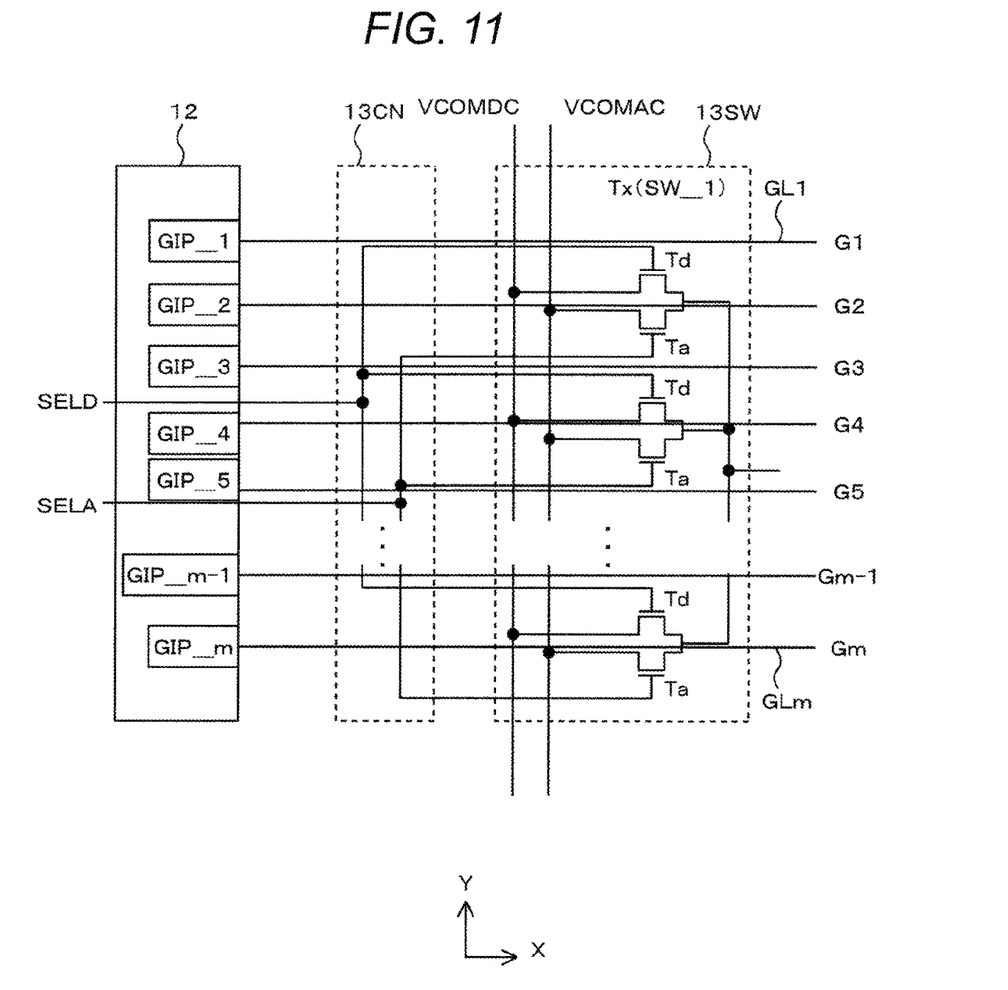
FIG. 11 is a diagram illustrative of the disposition relationship between a switch unit of the common scanning circuit and gate lines of the display device according to the example.

FIG. 5 is a cross sectional view of the display device according to the example. FIG. 6 is a plan view illustrative of a counter substrate of the display device according to the example. FIG. 7 is a plan view illustrative of an array substrate of the display device according to the example. FIGS. 8 and 9 are block diagrams of the display device according to the example. FIG. 8 is a block diagram of a portion formed on the array substrate. FIG. 9 is a block diagram of a touch detecting portion. FIG. 10 is a diagram illustrative of a common scanning circuit and a gate scanning circuit of the display device according to the example. FIG. 11 is a diagram illustrative of the disposition relationship between a switch unit of the common scanning circuit and gate lines of the display device according to the example.

As illustrated in FIG. 5, a display device 100 according to the example includes a display panel 1, a driver IC 5, a flexible circuit board 6, a flexible circuit board 7, a connecting unit 8, a connector 9, and a backlight 2. The display panel 1 is configured in which an array substrate 10 is overlaid with a counter substrate 20 as a predetermined gap is spaced, the array substrate 10 is attached to the counter substrate 20 with a sealing material (not illustrated) provided in a frame shape near the peripheral portion between the array substrate 10 and the counter substrate 20, a liquid crystal composition 30 is encapsulated and sealed on the inner side of the sealing material, and polarizers 40A and 40B are attached to the outer sides of the array substrate 10 and the counter substrate 20.

As illustrated in FIG. 6, a back side transparent conductive film (CD) on the counter substrate 20 is split into band patterns (in stripes), and is formed into a detection electrode (Rx1, Rx2, ..., Rxj-1, and Rxj) 21 of the touch panel. The detection electrode 21 is extended in the Y-direction. The detection electrode 21 of the touch panel is connected to the connecting unit 8.

Moreover, in the display device 100, a touch panel driving circuit and a detecting circuit are provided in the inside of the driver IC 5. The driver IC 5 is formed by CMOS processing on a single silicon substrate, and mounted on the array substrate 10 by COG (Chip On Glass) mounting in the form of a semiconductor chip.

As illustrated in FIG. 7, a pixel portion 15 is provided on the array substrate 10, and a common electrode 11 and a pixel electrode, not illustrated, are used for displaying images as a part of a pixel. A single common electrode 11 is shared by a plurality of pixels (pixels in 64 lines, for example) for use. The detection electrode 21 provided on the counter substrate 20 and the common electrode 11 provided on the array substrate 10 form a capacitance. When a touch panel scanning voltage ($V_{TX}$) is applied to the common electrode 11, the voltage of the detection electrode 21 is changed. In the application, when a conductor such as a finger comes close or makes a contact, the capacitance is changed, and a voltage taken place on the detection electrode 21 is changed as compared with the case where a conductor does not come close or does not make a contact. This change is taken to the driver IC 5 as a detection signal through the connecting unit 8, the flexible circuit board 7, the connector 9, and the flexible circuit board 6 as illustrated in FIG. 5. As described above, a change in the capacitance taken place between the common electrode 11 and the detection electrode 21 formed on the display panel is detected, so that the function of a touch panel can be provided on the display panel.

The driver IC 5 sends image signals to pixels disposed on the pixel portion 15 in a matrix configuration (a thin film transistor TRkm and a pixel electrode PTkm, described later) through an interconnection (a drain line DLk, described later) on the array substrate 10.

Transistors used for a gate scanning circuit 12 and a common scanning circuit 13 are N-channel thin film transistors (single channel thin film transistors), and formed of low temperature polysilicon, for example.

The gate scanning circuit (GIP) 12 is formed near the pixel portion (the display region) 15 on the array substrate 10. In this example, in FIG. 7, the gate scanning circuit 12 is disposed on the right side and the left side of the array substrate 10, and supplied with a power supply voltage, a control signal, and the like from the driver IC 5 through the interconnections, and can drive the pixels disposed on the pixel portion 15 in a matrix configuration from both sides. It is noted that the driving method is not limited to driving the pixels from both sides, and it may be fine that the pixels are alternately driven through every single gate line from the left and right sides (one side drive).

The common scanning circuit 13 is split into a shift register unit (Tx(S/R)) 13SR, a connecting unit 13CN, and a switch unit (Tx(SW)) 13SW, and the units are disposed as the gate scanning circuit 12 is sandwiched. The connecting unit 13CN is disposed between the gate scanning circuit 12 and the switch unit (Tx(SW)) 13SW. In FIG. 7, the common scanning circuit 13 is disposed on the right side and the left side of the array substrate 10, and supplied with the alternating drive signal (VCOMAC), the direct current drive signal (VCOMDC), and the like from the driver IC 5 through the interconnections. The common scanning circuit 13 is enabled to individually drive a plurality of the common electrodes (COM1, COM2, ..., COMn-1, and COMn) 11 arranged side by side from both sides. It is noted that the driving method is not limited to driving the common electrodes from both sides, and it may be fine that the common electrodes are alternately driven for every single common electrode from the left and the right (one side drive). In the case where the common scanning circuit 13 is configured of single channel transistors, it is necessary to form a retention capacitance and the like. Therefore, because of constraints on the layout (in the relation in which a retention capacitance having a large layout area is disposed near the end of the display panel having a margin for space, and the switch circuit that drives the common electrode having a large load is disposed close to the pixel portion 15), the shift register unit (Tx(S/R)) 13SR, the gate scanning circuit 12, the connecting unit 13CN, and the switch unit (Tx(SW)) 13SW are disposed in this order from the end of the display panel.

As illustrated in FIG. 8, on the array substrate 10, n sets of m lines of gate lines GL1 to GLm and n lines of common electrode signal lines (common lines) CL1 to CLn extended in the X-direction are provided, and k lines of drain lines DL1 to DLk extended in the Y-direction perpendicular to the X-direction are provided.

A region surrounded by the adjacent gate lines and the adjacent drain lines including the gate line GLm and the drain line DLk is a pixel region Pkm, and the thin film transistor TRkm and the pixel electrode PTkm are provided on the pixel region Pkm. The drain of the thin film transistor TRkm is connected to the drain line DLk, the gate of the thin film transistor TRkm is connected to the gate line GLm, and the source of the thin film transistor TRkm is connected to the pixel electrode PTkm. Moreover, the common electrode (COM1) 11 is provided opposite to the pixel electrode PTkm, and the common electrode (COM1) 11 is extended in the X-direction and connected to the common electrode signal line CL1. Not limited to the pixel region Pkm, a pixel region exists on the region surrounded by the adjacent gate lines and the adjacent drain lines. Thus, there are k×n×m pixel electrodes. The common electrodes (COM1, COM2, . . . , COMn−1, and COMn) 11 are individually shared by k×m pixels for use.

The common scanning circuit 13 is provided on the left and right edge portions of the array substrate 10, and signals (C1 to Cn) are inputted to the common electrode signal lines CL1 to CLn extended in the X-direction in parallel with one another by the common scanning circuit 13 from the left and right ends. Moreover, the gate scanning circuits 12 are also provided on the left and right edge portions of the array substrate 10, and gate signals (G1 to Gm) are inputted to the gate lines GL1 to GLm extended in the X-direction in parallel with one another by these gate scanning circuits 12 from the left and right ends. Furthermore, the driver IC 5 is provided on the lower picture frame portion of the array substrate 10, and the drain lines DL1 to DLk extended in the Y-direction in parallel with one another are driven by the driver IC 5 from the lower end.

As illustrated in FIG. 9, j electrodes of the detection electrodes (Rx1 to Rxj) 21 extended in the Y-direction are provided on the counter substrate 20. Signals (TD1 to TDj) from the detection electrode (Rx1 to Rxj) 21 are inputted to the driver IC 5 through detection electrode signal lines TDL1 to TDLj. The driver IC 5 includes a detection circuit (not illustrated) that detects a touch, and the detection circuit includes an integrating circuit, a sample-and-hold circuit, an A/D conversion circuit, a memory, a CPU, and the like. It is noted that it may be fine that the detection circuit is configured as an IC separated from the driver IC 5.

As illustrated in FIG. 10, the gate scanning circuit 12 has a function of in turn driving the gate lines of the pixels, and is configured of n×m stages of shift registers when there are n×m lines of the gate lines GL. Suppose that the gate scanning circuit 12 in the first stage is defined as GIP_1, the gate scanning circuit 12 in the second stage is defined as GIP_2, . . . , the gate scanning circuit 12 in the mth stage is defined as GIP_m, . . . , and the gate scanning circuit 12 in the (n×m)th stages is defined as GIP_nm. The common scanning circuit 13 has a function of in turn driving the common electrode 11, and is configured of n stages of shift register units and n sets of switch units when there are n electrodes of the common electrodes 11. Suppose that the shift register unit 13SR of the common scanning circuit in the first stage is defined as Tx(SR_1), the shift register unit 13SR in the second stage is defined as Tx(SR_2), . . . , and the shift register unit 13SR in the nth stage is defined as Tx(SR_n). Suppose that the switch unit 13S of the common scanning circuit in the first stage W is defined as Tx(SW_1), the switch unit 13SW in the second stage is defined as Tx(SW_2), . . . , and the switch unit 13SW in the nth stage is defined as Tx(SW_n). In FIG. 10, m stages of the gate scanning circuits 12 are disposed on every one stage of the common scanning circuit 13. However, the configuration is not limited to this configuration. It may be fine that the number of stages of the gate scanning circuits 12 disposed on one stage of the common scanning circuit 13 is different among the common scanning circuits 13. For example, 52 stages of the gate scanning circuits 12 (52 gate lines) are disposed on the common scanning circuit 13 in the first stage, 56 stages of the gate scanning circuits 12 (56 gate lines) are disposed on the common scanning circuits 13 in the second stage to the twenty-second stage, and 52 stages of the gate scanning circuits 12 (52 gate lines) are disposed on the common scanning circuit 13 in the twenty-third stage. In this example, the total number of the gate lines is 1,280 lines, and the total number of the common electrodes is 23 lines.

As illustrated in FIG. 11, in the case where m stages of the gate scanning circuits 12 are disposed on every one stage of the common scanning circuit 13, one transistor Td is disposed between the gate lines and one transistor Ta is disposed between the gate lines, and m/2 transistors of the transistors Td and m/2 transistors of the transistors Ta are disposed on the switch unit (Tx(SW_1) in the first stage. Moreover, the number of interconnections connecting the connecting unit 13CN to the switch unit 13SW is m lines (m/2 lines of interconnections for the control signal (SELD) and m/2 lines of interconnections for the control signal (SELA)). It is noted that the interconnections connecting the connecting unit 13CN to the switch unit 13SW and the gate lines GL1, . . . , and GLm are extended in the X-direction. Furthermore, the interconnections for the control signals (SELD and SELA) from the shift register unit 13SR to the connecting unit 13CN are extended in the X-direction.

It may be fine that the number of stages of the gate scanning circuits 12 disposed on one side is not matched with the number (m) of the gate lines. In this case, it is fine that the total number of the gate scanning circuits 12 on the left and right sides is matched with the number of the gate lines. In FIG. 11, the transistor Td and the transistor Ta are alternately disposed. However, it may be fine that any one group of the transistors Td and the transistors Ta is all disposed first and then the other group of the transistors Td and the transistors Ta is disposed. Moreover, it may be fine that the transistors Td and the transistors Ta are disposed in such a manner that two transistors Td are disposed and then two transistors Ta are disposed as the transistor Td, the transistor Td, the transistor Ta, the transistor Ta, . . . , and so on. It may be fine that pluralities of the transistors Td and the transistors Ta are disposed in parallel with one another. It may be fine that the number of the transistors Td is not matched with the number of the transistors Ta.

On the array substrate 10, two metal layers are used, a layer for forming the gate line and a layer for forming the drain line, and the metal layers include an Al alloy layer, for example.

In the display device according to the example, the circuits can be formed of single channel thin film transistors, so that it is unnecessary to use a complementary thin film transistor (CMOS), the manufacture processes are decreased, and costs can be decreased.

What is claimed is:

1. A display device comprising:
an array substrate including a plurality of pixels, a plurality of signal lines supplying a signal to the plurality of pixels, a plurality of common electrodes, and a common signal output circuit;
wherein one of the common electrode is overlapped with the plurality of pixels,
the common signal output circuit includes a plurality of switch units,
wherein the switch unit includes a plurality of first transistors which are configured to output a direct current drive signal to one of the plurality of common electrodes respectively, and a plurality of second transistors which are configured to output an alternating drive signal to one of the plurality of common electrodes respectively,
wherein inputs of the plurality of first transistors are connected to a direct current voltage line respectively,
wherein inputs of the plurality of second transistors are connected to an alternating drive signal line respectively, and
wherein the direct current voltage line and the alternating drive signal line are intersected with the plurality of signal lines.

2. The display device according to claim 1,
outputs of the plurality of the first transistors are connected to each other, and
outputs of the plurality of the second transistors are connected to each other.

3. The display device according to claim 1,
wherein a first control signal line is connected to gates of the plurality of first transistors and a second control signal line is connected to gates of the plurality of second transistors.

4. The display device according to claim 1,
wherein one of the plurality of common electrodes and outputs of the plurality of the first transistors are connected by a first connecting line and one of the plurality of common electrodes and outputs of the plurality of the second transistors are connected by a second connecting line.

5. The display device according to claim 4,
wherein the first connecting line and the second connecting line extend along the plurality of signal line.

6. A display device comprising:
an array substrate including a plurality of pixels, a plurality of signal lines supplying a signal to the plurality of pixels, a plurality of common electrodes, and a common signal output circuit;
wherein the plurality of common electrodes extend along the plurality of signal lines,
wherein one of the common electrode is overlapped with the plurality of pixels,
the common signal output circuit includes a plurality of switch units,
wherein the switch unit includes a plurality of first transistors which are configured to output a direct current drive signal to one of the plurality of common electrodes respectively, and a plurality of second transistors which are configured to output an alternating drive signal to one of the plurality of common electrodes respectively,
wherein inputs of the plurality of first transistors are connected to a direct current voltage line respectively,
wherein inputs of the plurality of second transistors are connected to an alternating drive signal line respectively, and
wherein the direct current voltage line and the alternating drive signal line are intersected with the plurality of signal lines.

7. The display device according to claim 6,
outputs of the plurality of the first transistors are connected to each other, and
outputs of the plurality of the second transistors are connected to each other.

8. The display device according to claim 6,
wherein a first control signal line is connected to gates of the plurality of first transistors and a second control signal line is connected to gates of the plurality of second transistors.

9. The display device according to claim 6,
wherein one of the plurality of common electrodes and outputs of the plurality of the first transistors are connected by a first connecting line and one of the plurality of common electrodes and outputs of the plurality of the second transistors are connected by a second connecting line.

10. The display device according to claim 9,
wherein the first connecting line and the second connecting line extend along the plurality of signal line.

* * * * *